(12) United States Patent
Meyer Timmerman Thijssen et al.

(10) Patent No.: US 12,416,759 B2
(45) Date of Patent: Sep. 16, 2025

(54) METHOD FOR FORMING MULTI-DEPTH OPTICAL DEVICES

(71) Applicant: Applied Materials, Inc., Santa Clara, CA (US)

(72) Inventors: Rutger Meyer Timmerman Thijssen, Sunnyvale, CA (US); Guannan Chen, Belmont, CA (US)

(73) Assignee: Applied Materials, Inc., Santa Clara, CA (US)

( * ) Notice: Subject to any disclaimer, the term of this patent is extended or adjusted under 35 U.S.C. 154(b) by 303 days.

(21) Appl. No.: 18/076,242

(22) Filed: Dec. 6, 2022

(65) Prior Publication Data

US 2023/0194784 A1  Jun. 22, 2023

Related U.S. Application Data

(60) Provisional application No. 63/265,910, filed on Dec. 22, 2021.

(51) Int. Cl.
| | |
|---|---|
| *G02B 1/00* | (2006.01) |
| *F21V 8/00* | (2006.01) |
| *G02B 5/18* | (2006.01) |
| *G02B 6/122* | (2006.01) |
| *G02B 6/136* | (2006.01) |
| *G02B 6/42* | (2006.01) |
| *G02B 27/00* | (2006.01) |

(Continued)

(52) U.S. Cl.
CPC ............. *G02B 6/122* (2013.01); *G02B 1/002* (2013.01); *G02B 5/1814* (2013.01); *G02B 5/1866* (2013.01); *G02B 6/0016* (2013.01); *G02B 6/136* (2013.01); *G02B 6/4204* (2013.01); *G02B 27/0081* (2013.01); *G02B 6/124* (2013.01); *G02B 27/0172* (2013.01)

(58) Field of Classification Search
CPC .... G02B 1/002; G02B 5/1814; G02B 5/1857; G02B 5/1866; G02B 6/0016; G02B 6/0065; G02B 6/122; G02B 6/124; G02B 6/136; G02B 6/4204; G02B 27/0081; G02B 27/0172; G02B 2027/0194
See application file for complete search history.

(56) References Cited

U.S. PATENT DOCUMENTS

| | | | |
|---|---|---|---|
| 8,506,829 B2 * | 8/2013 | Zhou ................. | B82Y 20/00 216/2 |
| 9,874,700 B2 * | 1/2018 | Sugama ............. | G02B 6/124 |

(Continued)

OTHER PUBLICATIONS

International Search Report and Written Opinion dated Apr. 24, 2023 for PCT application No. PCT/US2022/080977.

*Primary Examiner* — Ryan A Lepisto
(74) *Attorney, Agent, or Firm* — Patterson + Sheridan, LLP

(57) ABSTRACT

An optical device and a method of forming an optical device having multi-depth optical device structures with a refractive index greater than or equal to 2.0 are provided. The optical devices and method include forming first matrix stack structures and second matrix stack structures. Adjacent first matrix stack structures form first vias having a first depth and adjacent second matrix stack structures form second vias having a second depth. The first depth of the first vias being different than the second depth of the second vias provides from the formation of submicron, multi-depth optical device structures when the vias are backfilled with a device material.

20 Claims, 7 Drawing Sheets

(51) Int. Cl.
    *G02B 6/124*    (2006.01)
    *G02B 27/01*    (2006.01)

(56) References Cited

U.S. PATENT DOCUMENTS

| | | | |
|---|---|---|---|
| 10,025,031 B2* | 7/2018 | Tokushima | G02B 6/136 |
| 10,139,563 B2* | 11/2018 | Baudot | G02B 6/136 |
| 10,241,244 B2* | 3/2019 | Miller | G02B 5/1857 |
| 10,274,678 B1* | 4/2019 | Liu | H01L 21/30608 |
| 11,002,915 B2* | 5/2021 | Kuo | G02B 6/30 |
| 11,512,385 B2* | 11/2022 | Olson | C23C 14/221 |
| 12,050,344 B2* | 7/2024 | Messer | G02B 6/1223 |
| 2008/0265338 A1* | 10/2008 | Yu | H10D 30/024 |
| | | | 257/397 |
| 2014/0193115 A1* | 7/2014 | Popovic | G02B 6/124 |
| | | | 385/14 |
| 2015/0117817 A1* | 4/2015 | Chen | G02B 6/305 |
| | | | 359/569 |
| 2017/0192170 A1 | 7/2017 | Baudot et al. | |
| 2018/0358777 A1 | 12/2018 | Chen et al. | |
| 2020/0194217 A1 | 6/2020 | Godet et al. | |
| 2020/0257025 A1 | 8/2020 | Tekolste et al. | |
| 2021/0057874 A1 | 2/2021 | Yu | |

\* cited by examiner

METHOD FOR FORMING MULTI-DEPTH OPTICAL DEVICES

CROSS-REFERENCE TO RELATED APPLICATIONS

This application claims benefit of U.S. Provisional Patent Application No. 63/265,910, filed Dec. 22, 2021, which is herein incorporated by reference.

BACKGROUND

Field

Embodiments of the present disclosure generally relate to optical devices for augmented, virtual, and mixed reality. More specifically, embodiments described herein relate to an optical device and a method of forming an optical device having multi-depth optical device structures with a refractive index greater than or equal to 2.0.

Description of the Related Art

An optical device may be used to manipulate the propagation of light using structures of the optical device formed on a substrate. The optical device includes an arrangement of structures with in-plane dimensions smaller than half a design wavelength of light. The structures have sub-micron critical dimensions, e.g., nanosized dimensions, to alter light propagation by manipulating photons in order to induce localized phase discontinuities (i.e., abrupt changes of phase over a distance smaller than the wavelength of light). In addition to having sub-micron critical dimensions, it is desirable for different sections of the optical device to have structures with different heights. It is also desirable to have a high contrast ratio between the refractive index of the structures and the refractive index of the area between the structures to improve the performance of the optical device.

However, forming an optical device having sub-micron critical dimensions from a high refractive index material, i.e. a material with a refractive index greater than about 2.0, may be challenging. For example, etching a layer of high refractive index material to form structures of differing heights may result in non-uniform critical dimensions. Accordingly, what is needed in the art is an optical device and a method of forming an optical device having multi-depth optical device structures with the refractive index greater than or equal to 2.0.

SUMMARY

In one embodiment, a method is provided. The method includes disposing a matrix stack over a substrate, the substrate having at least a first section and a second section, forming a first patterned hardmask over the matrix stack, the first patterned hardmask having first hardmask structures over the first section, removing exposed first portions of the matrix stack of the first section to form first matrix stack structures, the first matrix stack structures defining first vias, forming a second patterned hardmask over the matrix stack, the second patterned hardmask having second hardmask structures over the second section, removing exposed second portions of the matrix stack of the second section to form second matrix stack structures, the second matrix stack structures defining second vias, removing the first patterned hardmask and second patterned hardmask, and forming first optical device structures over the first section and second optical device structures over the second section, the forming the first optical device structures and the second optical device structures comprising disposing a device material in the first vias and the second vias.

In another embodiment, a method is provided. The method includes disposing a matrix stack of a first matrix layer, an etch-stop layer, and a second matrix layer over a substrate, the substrate having at least a first section and a second section, forming a first patterned hardmask over the matrix stack, the first patterned hardmask having first hardmask structures over the first section, removing exposed first portions of the second matrix layer of the first section to form first matrix stack structures, the first matrix stack structures defining first vias, forming a second patterned hardmask over the matrix stack, the second patterned hardmask having second hardmask structures over the second section, removing exposed second portions of the second matrix layer, the etch-stop layer, and the first matrix layer of the second section to form second matrix stack structures, the second matrix stack structures defining second vias, and forming first optical device structures over the first section and second optical device structures over the second section, the forming the first optical device structures and the second optical device structures comprising disposing a device material in the first vias and the second vias, wherein the first optical device structures have a first depth from the etch-stop layer to a first upper surface of the first optical device structures and the second optical device structures having a second depth from the substrate to a second upper surface of the second optical device structures.

In yet another embodiment, an optical device is provided. The optical device includes a first section of first optical device structures, wherein first matrix stack structures defining the first optical device structures, the first matrix stack structures include a second matrix layer disposed over a first matrix layer, and the first optical device structures have a first depth from the first matrix layer to a first upper surface of the first optical device structures. The optical device also includes a second section of second optical device structures, wherein second matrix stack structures defining the second optical device structures, the second matrix stack structures include the first matrix layer and the second matrix layer disposed over the first matrix layer, and the second optical device structures have a second depth from an optical device substrate to a second upper surface of the second optical device structures.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, and may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Embodiments of the present disclosure generally relate to optical devices for augmented, virtual, and mixed reality. More specifically, embodiments described herein relate to an optical device and a method of forming an optical device having multi-depth optical device structures with a refractive index greater than or equal to 2.0.

Figure 1:
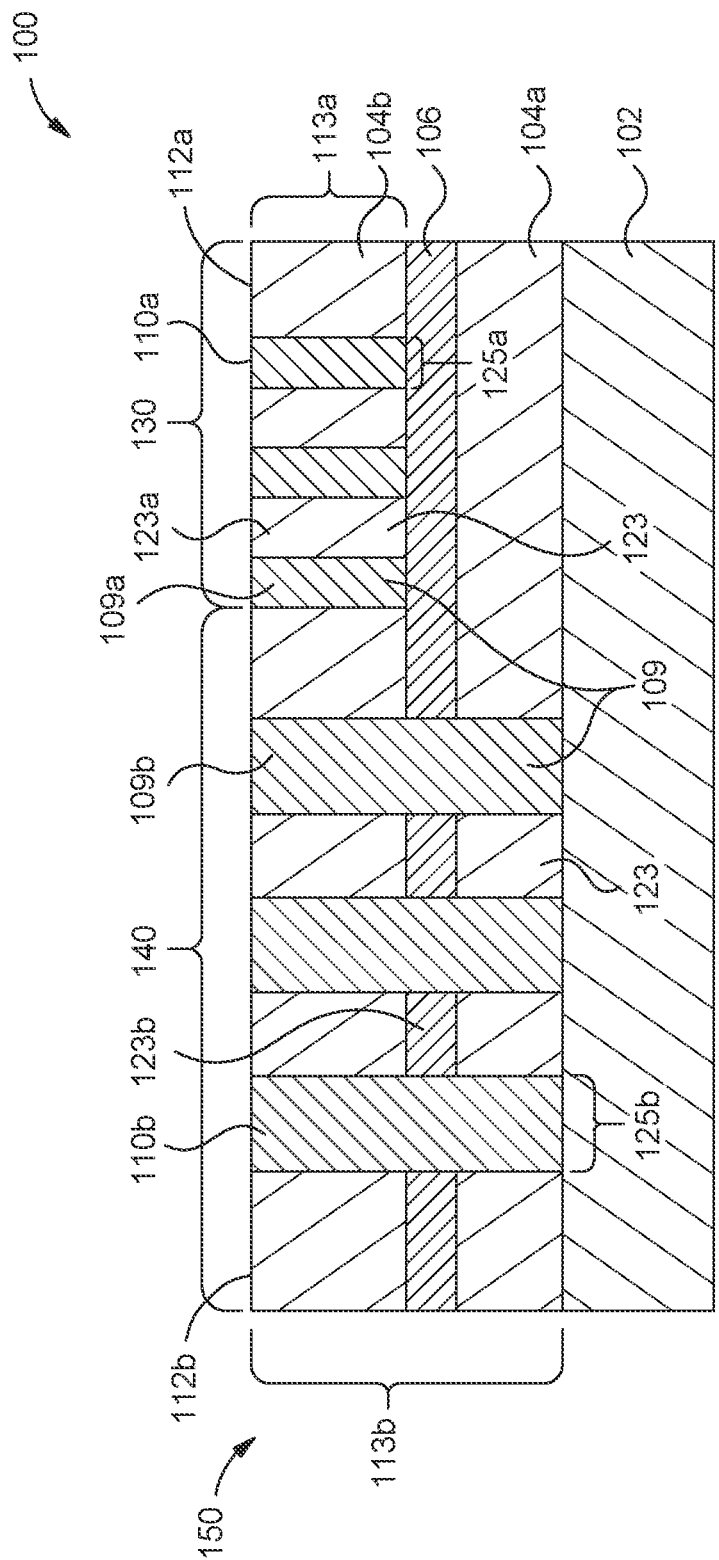
FIG. 1 is a schematic, cross-sectional view of a portion of an optical device according to one or more embodiments.
Figure 4A:
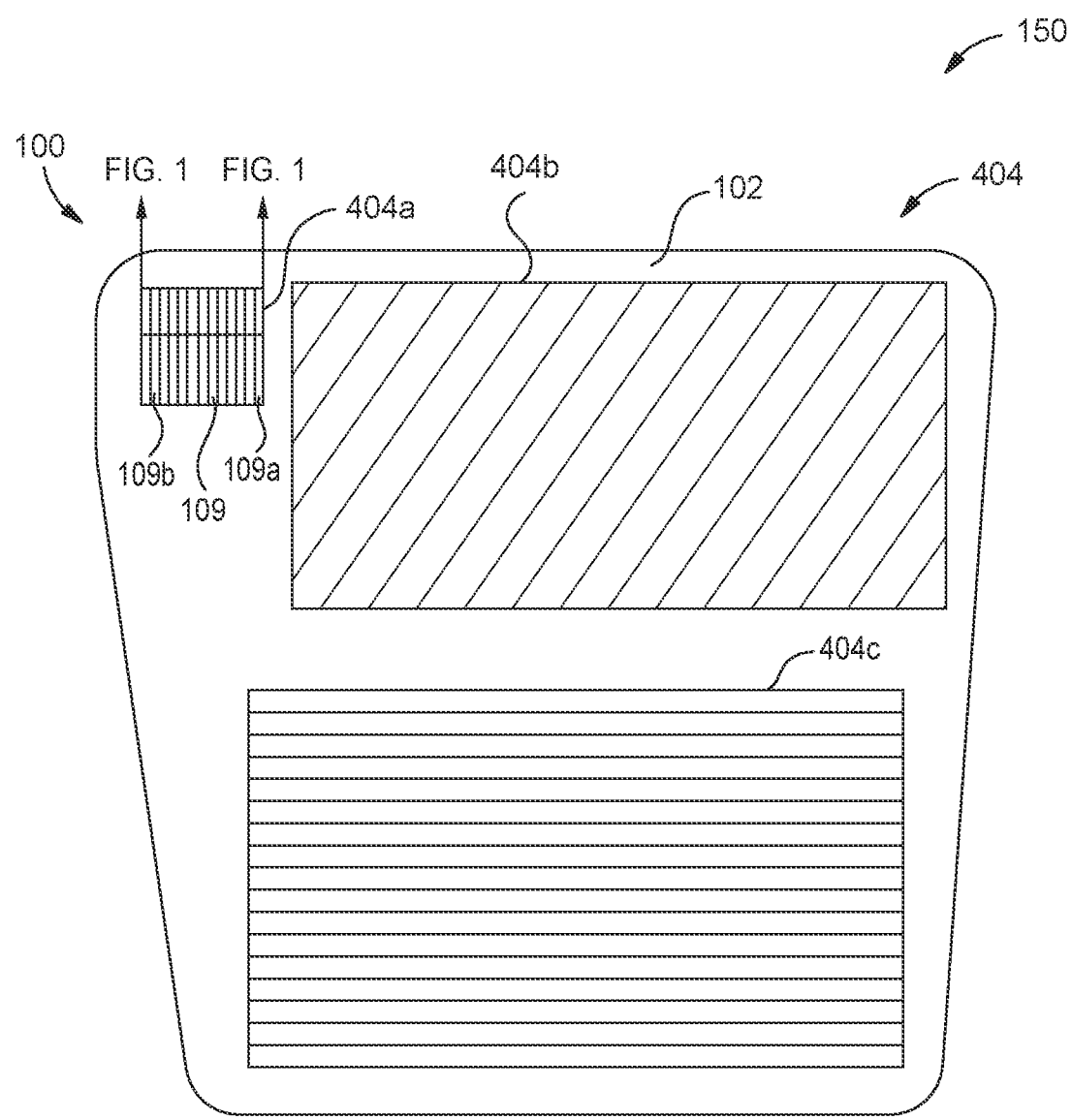
FIG. 4A is a perspective, frontal view of an optical device according to embodiments described herein.
Figure 4B:
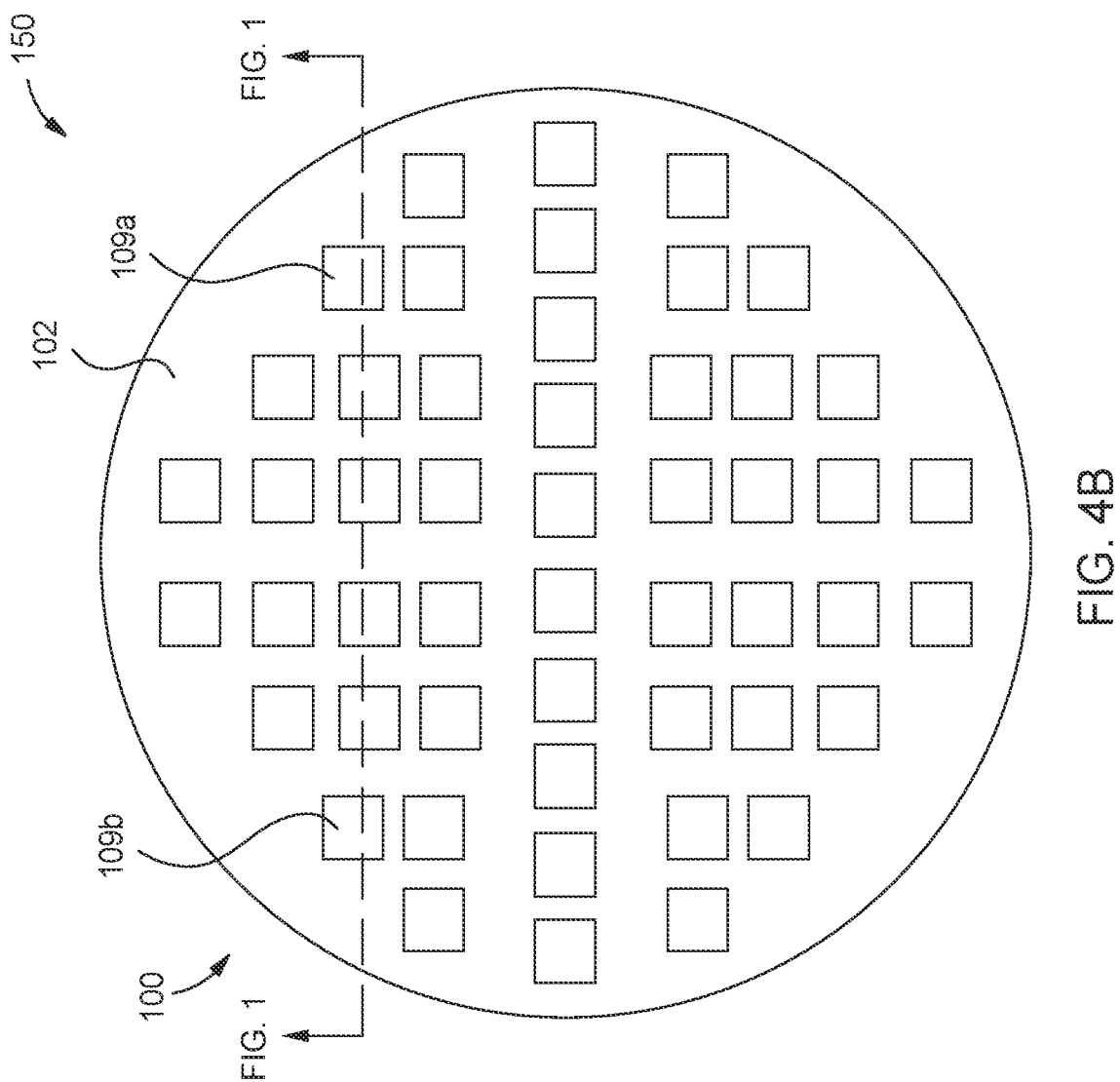
FIG. 4B is schematic, top view of an optical device according to embodiments described herein.

FIG. 1 is a schematic, cross-sectional view of a portion 100 of an optical device substrate 102 according to one or more embodiments. In one embodiment, which can be combined with other embodiments described herein, the optical device 150 is a flat optical device, such as a metasurface. In another embodiment, which can be combined with other embodiments described herein, the optical device 150 is a waveguide combiner, such as an augmented waveguide combiner. The portion 100 may correspond to a portion of a flat optical device or a portion of a waveguide combiner. In one example, the portion 100 corresponds to a grating of a waveguide combiner, such as one or more of an input coupling grating, an intermediate grating, or an output coupling grating. The portion 100 may correspond to a cross-section as depicted in FIGS. 4A and 4B.

The optical device 150 includes a plurality of optical device structures 109 disposed over an optical device substrate 102. A first section 130 of the portion 100 of the optical device substrate 102 includes a plurality of first optical device structures 109a. A second section 140 of the portion 100 of the optical device substrate 102 includes a plurality of second optical device structures 109b. While the portion 100 of the optical device substrate 102 depicts the first section 130 and the second section 140, the optical device 150 may include additional sections of optical device structures 109.

The plurality of optical device structures 109 have a depth and a critical dimension. More specifically, the first optical device structures 109a have a depth 113a and a critical dimension 125a, and the second optical device structures 109b have a depth 113b and a critical dimension 125b. The critical dimension 125a corresponds to a width or a diameter of the first optical device structures 109a and the critical dimension 125b correspond to the width or the diameter of the second optical device structures 109b. In some embodiments, the critical dimension 125a and the critical dimension 125b are the same. In other embodiments, the critical dimension 125a and the critical dimension 125b are different. The critical dimension 125a and the critical dimension 125b are less than 1 micrometer (μm). In one embodiment, which may be combined with other embodiments described herein, the critical dimension 125a and the critical dimension 125b are about 100 nanometers (nm) to about 1000 nm. The depth 113a is the distance from an optional etch-stop layer 106 to a first upper surface 110a of the first optical device structures 109a. The depth 113b is the distance from the substrate to a second upper surface 110b of the second optical device structures 109b. The depth 113a and the depth 113b are different. The etch-stop layer 106 is an optional layer. In embodiments without an optional etch-stop layer 106, the depth 113a corresponds to the thickness of the second matrix layer 104b.

The first optical device structures 109a may have a first aspect ratio defined by a ratio of the depth 113a to the critical dimension 125a. The second optical device structures 109b may have a second aspect ratio defined by a ratio of the depth 113b to the critical dimension 125b. The first aspect ratio and the second aspect ratio are about 1:1.5 to about 1:20, such as about 1:10 to about 1:15. The first aspect ratio and the second aspect ratio may be different from each other.

The plurality of optical device structures 109 have a device refractive index. The device refractive index is greater than about 2.0. The plurality of optical device structures 109 include, but are not limited to, one or more of silicon (e.g. amorphous silicon), silicon carbide (SiC), silicon oxycarbide (SiOC), titanium dioxide ($TiO_2$), silicon dioxide ($SiO_2$), vanadium (IV) oxide (VOx), aluminum oxide ($Al_2O_3$), aluminum-doped zinc oxide (AZO), indium tin oxide (ITO), tin dioxide ($SnO_2$), zinc oxide (ZnO), tantalum pentoxide ($Ta_2O_5$), silicon nitride ($Si_3N_4$), zirconium dioxide ($ZrO_2$), niobium oxide ($Nb_2O_5$), cadmium stannate ($Cd_2SnO_4$), or silicon carbon-nitride (SiCN) containing materials.

The optical device 150 includes a plurality of matrix stack structures 123. Adjacent matrix stack structures 123 include an optical device structure 109 disposed therebetween. Each of the matrix stack structures 123 include at least a first matrix layer 104a disposed over the optical device substrate 102, an optional etch-stop layer 106 disposed over the first matrix layer 104a, and a second matrix layer 104b disposed over the optional etch-stop layer 106. The first section 130 of the portion 100 of the optical device substrate 102 includes a plurality of first matrix stack structures 123a and the second section 140 of the portion 100 of the optical device substrate 102 includes a plurality of second matrix stack structures 123b. Adjacent first optical device structures 109a include a first matrix stack structure 123a disposed therebetween. Adjacent second optical device structures 109b include a second matrix stack structure 123b disposed therebetween.

Each of the plurality of first optical device structures 109a include a bottom surface contacting the optional etch-stop layer 106 and side surfaces contacting adjacent first matrix stack structures 123a. The first upper surface 110a of the first optical device structures 109a aligns with a first upper surface 112a of the first matrix stack structures 123a. Each of the plurality of second optical device structures 109b include a bottom surface contacting the optical device substrate 102 and side surfaces contacting adjacent second matrix stack structures 123b. The second upper surface 110b of the second optical device structures 109b aligns with a second upper surface 112b of the second matrix stack structures 123b. The depth 113a is about 100 nm to about 750 nm corresponding to a thickness of the second matrix layer 104b. In embodiments including the etch-stop layer 106, the depth 113b is about 200 nm to about 1550 nm corresponding to a total thickness of the first matrix layer 104a, the optional etch-stop layer 106, and the second matrix layer 104b. In embodiments without the etch-stop layer 106, the depth 113b is about 200 nm to about 1500 nm corresponding to a total thickness of the first matrix layer 104a and the second matrix layer 104b. The thickness of the first matrix layer 104a is about 100 nm to about 750 nm. The thickness of the optional etch-stop layer 106 is less than 50 nm.

The matrix stack structures 123 have a matrix stack refractive index corresponding to an average of the refractive index of the materials of the first matrix layer 104a, the optional etch-stop layer 106, and the second matrix layer 104b. The matrix stack refractive index is less than 2.0, such as less than about 1.5. The contrast ratio between the device refractive index and the matrix stack refractive index is from about 1.7:1.45 to about 3.7:1.45. The optional etch-stop layer 106 may include a same material as or a different material than the optical device substrate 102. The optional etch-stop layer 106 includes a same material as or a different material than the first matrix layer 104a. The optional etch-stop layer 106 includes a same material as or a different material than the first matrix layer 104a and the second matrix layer 104b. The second matrix layer 104b includes a same material as or a different material than the first matrix layer 104a.

The first matrix layer 104a and the second matrix layer 104b include, but are not limited to, silicon dioxide ($SiO_2$). The optional etch-stop layer 106 includes, but is not limited to, one or more of silicon (e.g. amorphous silicon), silicon carbide (SiC), silicon oxycarbide (SiOC), titanium dioxide ($TiO_2$), silicon dioxide ($SiO_2$), vanadium (IV) oxide (VOx), aluminum oxide ($Al_2O_3$), aluminum-doped zinc oxide (AZO), indium tin oxide (ITO), tin dioxide ($SnO_2$), zinc oxide (ZnO), tantalum pentoxide ($Ta_2O_5$), silicon nitride ($Si_3N_4$), zirconium dioxide ($ZrO_2$), niobium oxide ($Nb_2O_5$), cadmium stannate ($Cd_2SnO_4$), or silicon carbon-nitride (SiCN) containing materials.

The optical device substrate 102 may be any suitable material, provided that the optical device substrate 102 can adequately transmit light in a desired wavelength or wavelength range. Substrate selection may include substrates of any suitable material, including, but not limited to, amorphous dielectrics, non-amorphous dielectrics, crystalline dielectrics, silicon oxide, polymers, and combinations thereof. In some embodiments, which may be combined with other embodiments described herein, the optical device substrate 102 includes a transparent material. In one embodiment, which can be combined with other embodiments described herein, the optical device substrate 102 includes, but is not limited to, one or more of silicon (Si), silicon dioxide ($SiO_2$), silicon carbide (SiC), germanium (Ge), silicon germanium (SiGe), indium phosphide (InP), gallium arsenide (GaAs), gallium nitride (GaN), fused silica, quartz, or sapphire. In another embodiment, which can be combined with other embodiments described herein, the optical device substrate 102 includes high-index transparent materials, such as high-refractive-index (high RI) glass.

Figure 2:
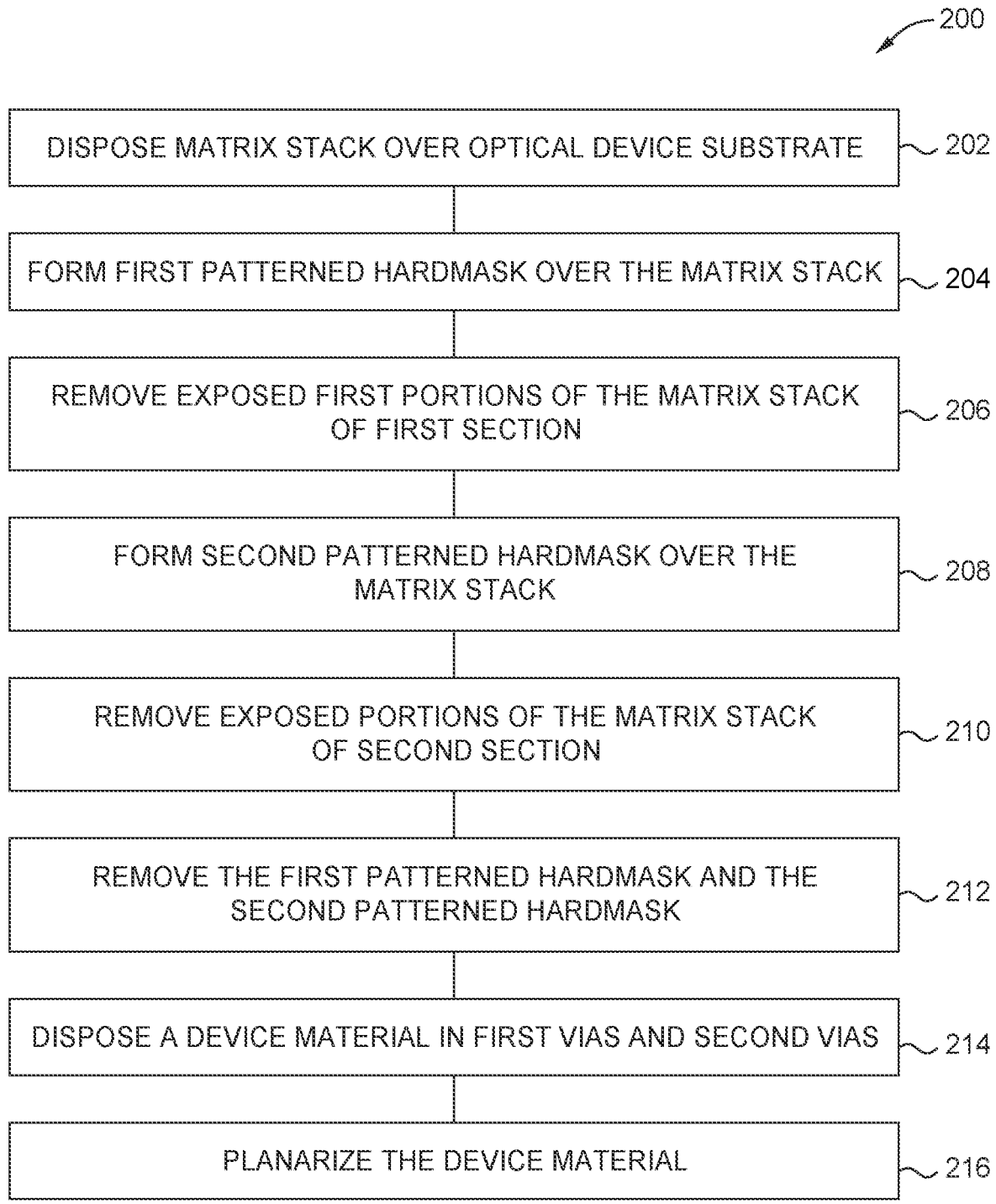
FIG. 2 is a flow diagram of a method of forming an optical device according to one or more embodiments.

FIG. 2 is a flow diagram of a method 200 of forming an optical device 150. FIGS. 3A-3G are schematic, cross-sectional views of a portion 100 of an optical device substrate 102.

Figure 3A:
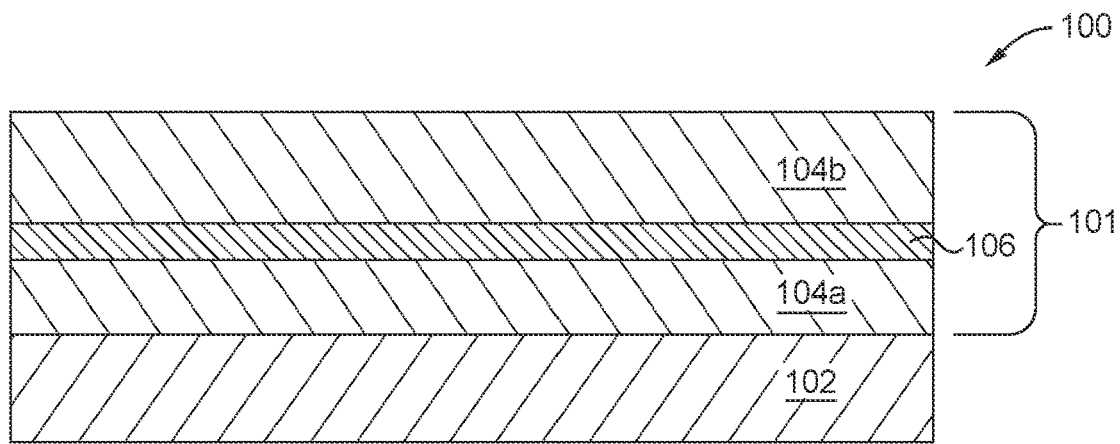
FIGS. 3A-3G are schematic, cross-sectional views of a portion of an optical device substrate according to one or more embodiments.

At operation 202, as shown in FIG. 3A, a matrix stack 101 is disposed over the optical device substrate 102. The matrix stack 101 includes the first matrix layer 104a, the optional etch-stop layer 106, and the second matrix layer 104b. The first matrix layer 104a is disposed between the optical device substrate 102 and the optional etch-stop layer 106. The second matrix layer 104b is disposed over the optional etch-stop layer 106. The first matrix layer 104a has a thickness substantially equal to or a thickness different from the second matrix layer 104b.

Figure 3B:
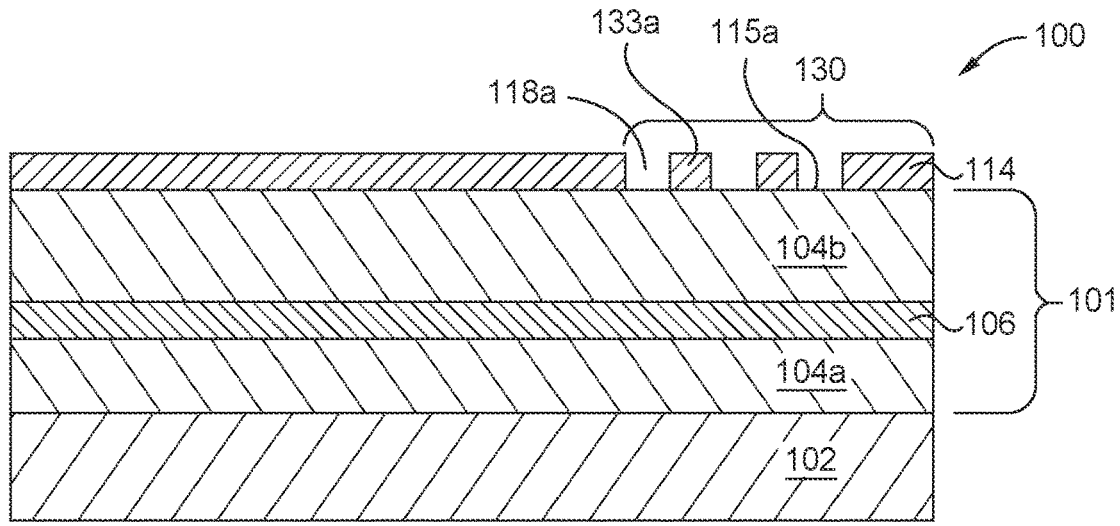

At operation 204, as shown in FIG. 3B, a first patterned hardmask 114 is formed over the matrix stack 101. The first patterned hardmask 114 includes first hardmask structures 133a formed over the first section 130 of the optical device substrate 102. The first hardmask structures 133a form exposed first portions 115a of the matrix stack 101 of the first section 130 by defining first contact holes 118a of the first patterned hardmask 114. Forming the first patterned hardmask 114 includes disposing a first hardmask material over the matrix stack 101, disposing a photoresist over the first hardmask material, patterning the photoresist to expose portions of the first hardmask material, and removing the exposed portions of the first hardmask material to form the first hardmask structures 133a. The first hardmask material may include, but is not limited to silicon nitride ($Si_3N_4$).

Figure 3C:
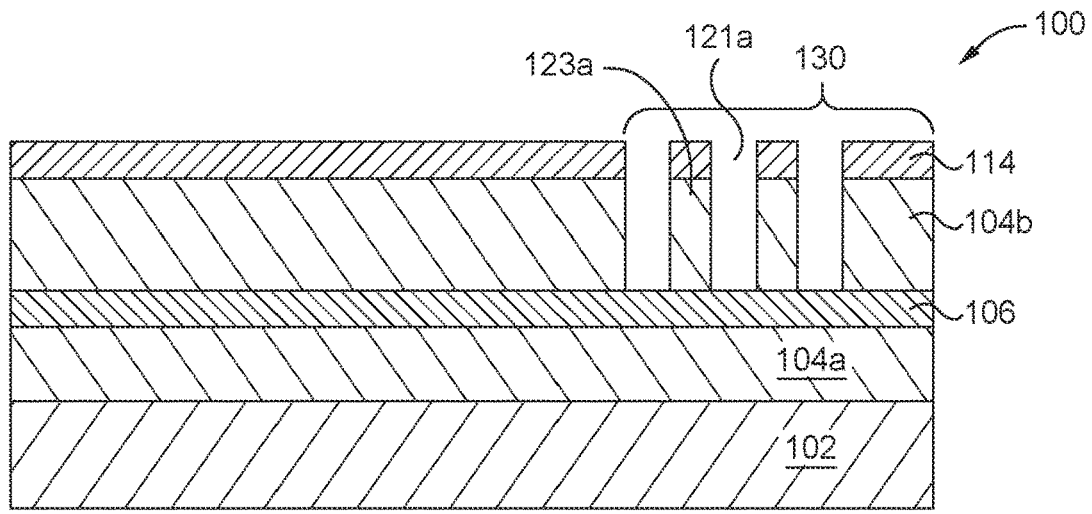

At operation 206, as shown in FIG. 3C, the exposed first portions 115a of the matrix stack 101 of the first section 130 are removed. Removing the exposed first portions 115a of the matrix stack 101 forms first matrix stack structures 123a. The first matrix stack structures 123a define first vias 121a such that two adjacent first matrix stack structures 123a have a first via 121a disposed therebetween. The forming of the first matrix stack structures 123a includes removing the second matrix layer 104b to expose the optional etch-stop layer 106. In an optional operation, at least one of the first vias 121a, the second vias 121b, the first contact holes 118a, or the second contact holes 118b are shrunk.

Figure 3D:
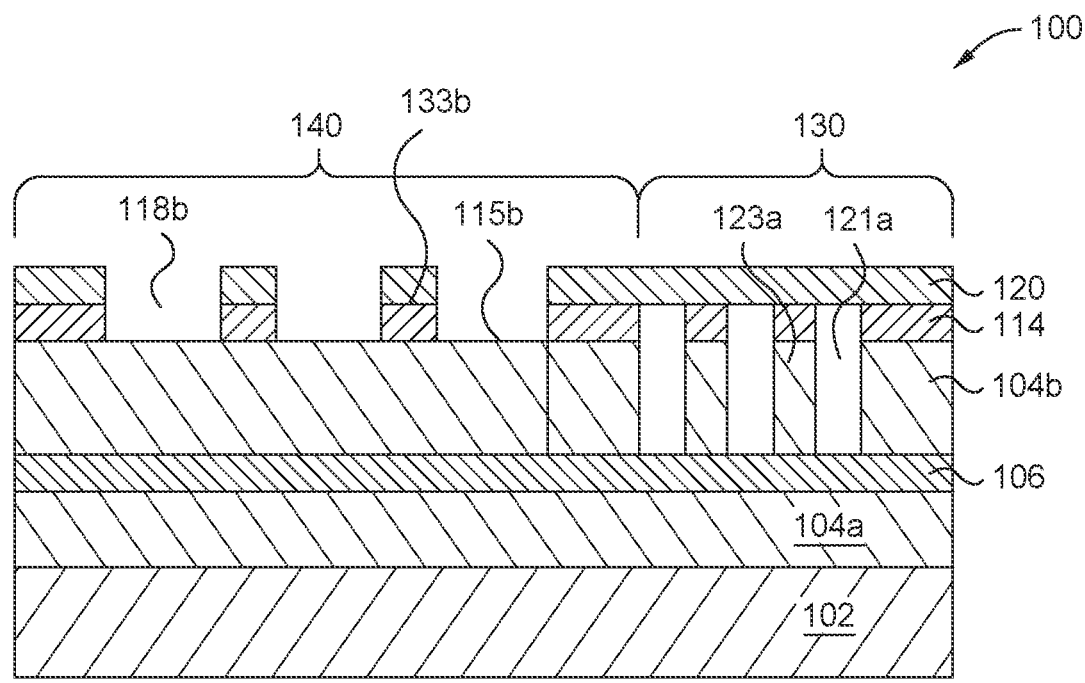

At operation 208, as shown in FIG. 3D, a second patterned hardmask 120 is formed over the matrix stack 101. The second patterned hardmask 120 includes second hardmask structures 133b formed over the second section 140 of the optical device substrate 102. The second hardmask structures 133b form exposed second portions 115b of the matrix stack 101 of the second section 140 by defining second contact holes 118b of the second patterned hardmask 120. Forming the second patterned hardmask 120 includes disposing a second hardmask material over the matrix stack 101, disposing a photoresist over the second hardmask material, patterning the photoresist to expose portions of the second hardmask material, and removing the exposed portions of the second hardmask material to form the second hardmask structures 133b. The second hardmask material may include, but is not limited to silicon nitride ($Si_3N_4$).

Figure 3E:
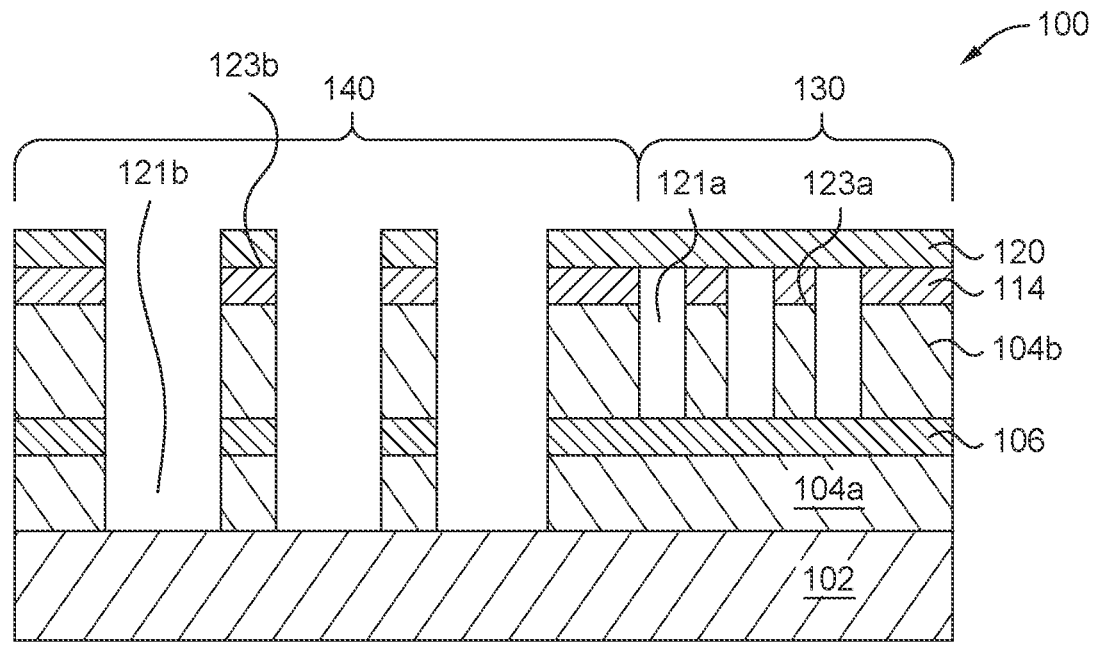

At operation 210, as shown in FIG. 3E, the exposed second portions 115b of the matrix stack 101 of the second section 140 are removed. Removing the exposed second portions 115b forms second matrix stack structures 123b. The second matrix stack structures 123b define second vias 121b such that two adjacent second matrix stack structures 123b have a second via 121b disposed therebetween. The forming of the second matrix stack structures 123b includes removing the second matrix layer 104b, the optional etch-stop layer 106, and the first matrix layer 104a to expose the optical device substrate 102.

Figure 3F:
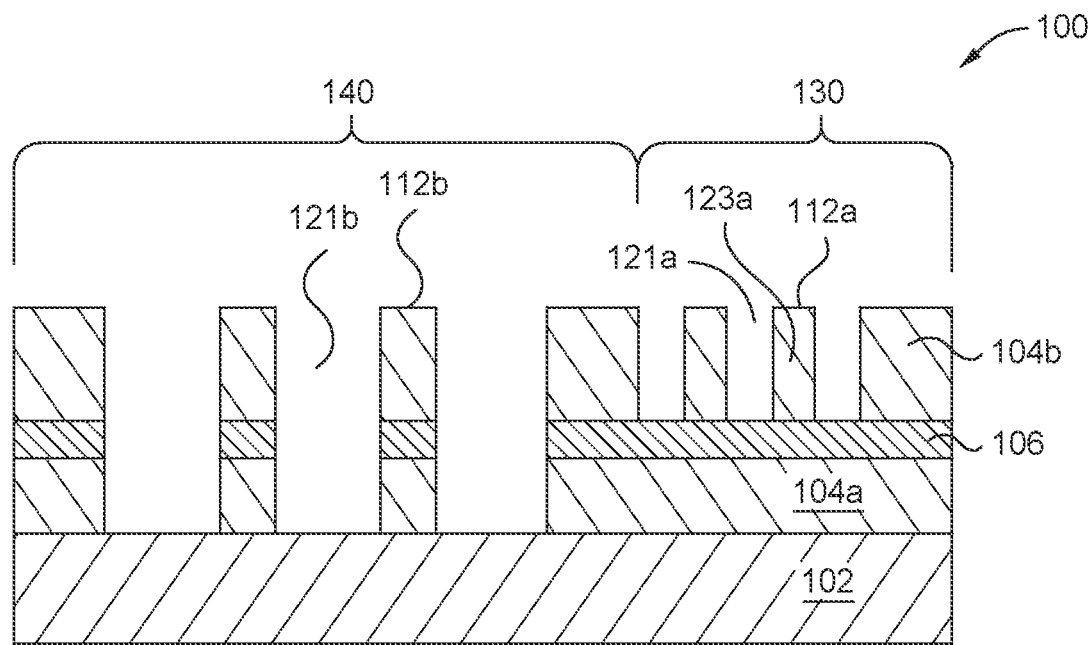

At operation 212, as shown in FIG. 3F, the first patterned hardmask 114 and the second patterned hardmask 116 are removed. Residual photoresist materials are also removed.

Figure 3G:
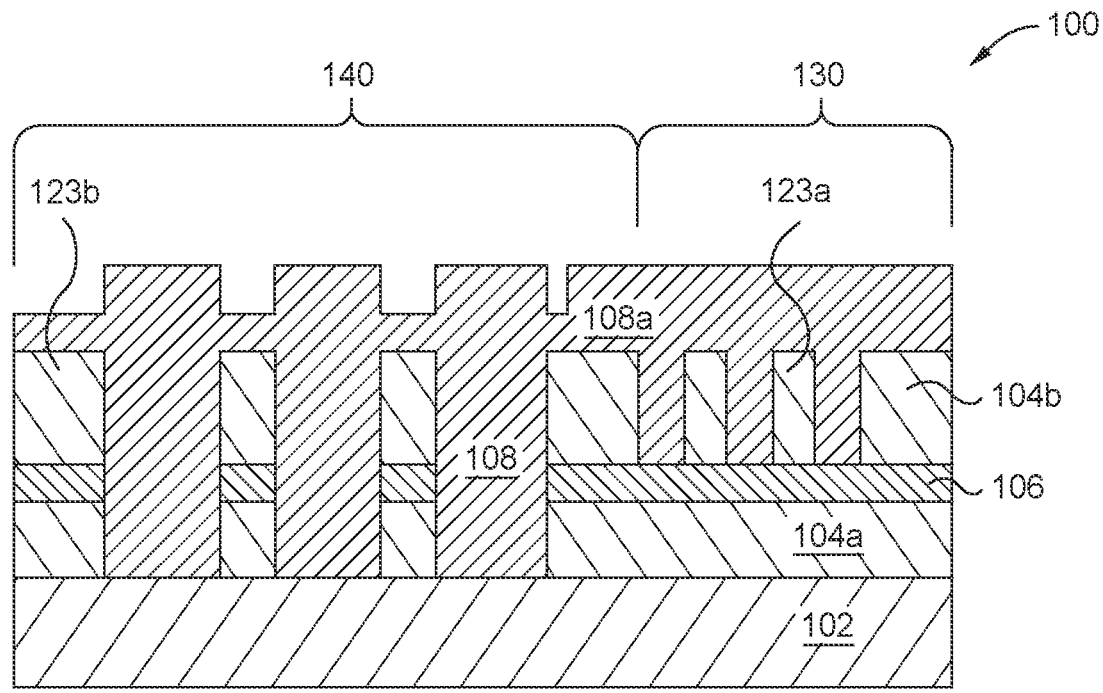

At operation 214, as shown in FIG. 3G, a device material 108 is disposed in the first vias 121a and second vias 121b. In one example, the device material 108 is disposed by Atomic Layer Deposition (ALD). The device material may include one or more of silicon oxycarbide (SiOC), titanium dioxide ($TiO_2$), silicon dioxide ($SiO_2$), vanadium (IV) oxide (VOx), aluminum oxide ($Al_2O_3$), aluminum-doped zinc oxide (AZO), indium tin oxide (ITO), tin dioxide ($SnO_2$), zinc oxide (ZnO), tantalum pentoxide ($Ta_2O_5$), silicon nitride ($Si_3N_4$), zirconium dioxide ($ZrO_2$), niobium oxide ($Nb_2O_5$), cadmium stannate ($Cd_2SnO_4$), or silicon carbon-nitride (SiCN) containing materials.

At operation 216, as shown in FIG. 1, the device material 108 is planarized. The device material 108 is planarized to form the first optical device structures 109a and the second optical device structures 109b such that the first upper surface 110a of the first optical device structures 109a aligns with the first upper surface 112a of the first matrix stack structures 123a and the second upper surface 110b of the second optical device structures 109b aligns with the second upper surface 112b of the second matrix stack structures 123b. In one example, the excess portion 108a of the device material 108 may be removed using chemical-mechanical planarization (CMP).

FIG. 4A is a perspective, frontal view of an optical device 150 of a first configuration. FIG. 4B is a schematic, top view of an optical device 150 of a first configuration. It is to be understood that the optical devices 150 of the first and second configurations described are exemplary optical devices. In one embodiment, which can be combined with other embodiments described herein, the optical device 150 of the first configuration is a waveguide combiner, such as an augmented reality waveguide combiner. In another embodiment, which can be combined with other embodiments described herein, the optical device 150 of the second configuration is a flat optical device, such as a metasurface. The optical devices 150 include the plurality of optical device structures 109 disposed the optical device substrate 102. The plurality of optical device structures 109 include the plurality of first optical device structures 109a and plurality of second optical device structures 109b. In one embodiment, which can be combined with other embodiments described herein, regions of the optical device structures 109 correspond to one or more gratings 404, such as a first grating 404a, a second grating 404b, and a third grating 404c. In one embodiment, which can combined with other embodiments described herein, the optical devices 150 is a waveguide combiner that includes at least the first grating 404a corresponding to an input coupling grating and the third grating 404c corresponding to an output coupling grating. The waveguide combiner according to the embodiment, which can be combined with other embodiments described herein, includes the second grating 404b corresponding to an intermediate grating. While FIG. 4B depicts the optical device structures 109 as having square or rectangular shaped cross-sections, the cross-sections of the optical device structures 109 may have other shapes including, but not limited to, circular, triangular, elliptical, regular polygonal, irregular polygonal, and/or irregular shaped cross-sections. In some embodiments, which can be combined with other embodiments described herein, the cross-sections of the optical device structures 109 on a single optical device 150 are different.

In summation, an optical device and a method of forming an optical device having multi-depth optical device structures with a refractive index greater than or equal to 2.0 are provided. The optical devices and method include forming first matrix stack structures and second matrix stack structures. Adjacent first matrix stack structures form first vias having a first depth and adjacent second matrix stack structures form second vias having a second depth. The first depth of the first vias being different than the second depth of the second vias provides from the formation of submicron, multi-depth optical device structures when the vias are backfilled with a device material.

While the foregoing is directed to embodiments of the present disclosure, other and further embodiments of the disclosure may be devised without departing from the basic scope thereof, and the scope thereof is determined by the claims that follow.

What is claimed is:

1. A method, comprising:
disposing a matrix stack over a substrate, the substrate having at least a first section and a second section;
forming a first patterned hardmask over the matrix stack, the first patterned hardmask having first hardmask structures over the first section;
removing exposed first portions of the matrix stack of the first section to form first matrix stack structures, the first matrix stack structures defining first vias;
forming a second patterned hardmask over the matrix stack, the second patterned hardmask having second hardmask structures over the second section;
removing exposed second portions of the matrix stack of the second section to form second matrix stack structures, the second matrix stack structures defining second vias;
removing the first patterned hardmask and second patterned hardmask; and
forming first optical device structures over the first section and second optical device structures over the second section, the forming the first optical device structures and the second optical device structures comprising disposing a device material in the first vias and the second vias, wherein:
the first matrix stack structures define the first optical device structures;
the first matrix stack structures include a second matrix layer disposed over a first matrix layer;
the first optical device structures have a first depth from the first matrix layer to a first upper surface of the first optical device structures;
a bottom surface of the first optical device structures contact an etch stop layer;
the second matrix stack structures define the second optical device structures;
the second matrix stack structures include the first matrix layer and the second matrix layer disposed over the first matrix layer;
the second optical device structures have a second depth from an optical device substrate to a second upper surface of the second optical device structures; and
a bottom surface of the second optical device structures contact a top surface of a substrate.

2. The method of claim 1, wherein the device material has a device refractive index greater than or equal to 2.0.

3. The method of claim 2, wherein the first matrix stack structures and the second matrix stack structures have a matrix stack refractive index less than 2.0.

4. The method of claim 3, wherein a contrast ratio between the device refractive index and the matrix stack refractive index is about 1.7:1.45 to about 3.7:1.45.

5. The method of claim 1, wherein the matrix stack comprises a first matrix layer, an etch-stop layer, and a second matrix layer.

6. The method of claim 5, wherein:
the removing exposed first portions of the matrix stack of the first section includes removing the second matrix layer to expose the etch-stop layer; and
the removing exposed second portions of the matrix stack of the second section includes removing the first matrix layer, the etch-stop layer, and the second matrix layer to expose the substrate.

7. The method of claim 6, wherein:
the first optical device structures have a first depth from the etch-stop layer to a first upper surface of the first optical device structures; and
the second optical device structures have a second depth from the substrate to a second upper surface of the second optical device structures.

8. The method of claim 1, wherein:
adjacent first hardmask structures define first contact holes; and
adjacent second hardmask structures define second contact holes.

9. The method of claim 8, further comprising shrinking at least one of the first vias.

10. The method of claim 1, further comprising planarizing the device material.

11. The method of claim 1, wherein the device material comprises one or more of silicon oxycarbide (SiOC), titanium dioxide ($TiO_2$), silicon dioxide ($SiO_2$), vanadium (IV) oxide (VOX), aluminum oxide ($Al_2O_3$), aluminum-doped zinc oxide (AZO), indium tin oxide (ITO), tin dioxide ($SnO_2$), zinc oxide (ZnO), tantalum pentoxide ($Ta_2O_5$), silicon nitride ($Si_3N_4$), zirconium dioxide ($ZrO_2$), niobium oxide ($Nb_2O_5$), cadmium stannate ($Cd_2SnO_4$), or silicon carbon-nitride (SiCN) containing materials.

12. A method, comprising:
disposing a matrix stack of a first matrix layer, an etch-stop layer, and a second matrix layer over a substrate, the substrate having at least a first section and a second section;
forming a first patterned hardmask over the matrix stack, the first patterned hardmask having first hardmask structures over the first section;
removing exposed first portions of the second matrix layer of the first section to form first matrix stack structures, the first matrix stack structures defining first vias;
forming a second patterned hardmask over the matrix stack, the second patterned hardmask having second hardmask structures over the second section;
removing exposed second portions of the second matrix layer, the etch-stop layer, and the first matrix layer of the second section to form second matrix stack structures, the second matrix stack structures defining second vias; and
forming first optical device structures over the first section and second optical device structures over the second section, the forming the first optical device structures and the second optical device structures comprising disposing a device material in the first vias and the second vias, wherein:
the first optical device structures have a first depth from the etch-stop layer to a first upper surface of the first optical device structures; and
the second optical device structures have a second depth from the substrate to a second upper surface of the second optical device structures, wherein:
the first matrix stack structures define the first optical device structures;
the first matrix stack structures include a second matrix layer disposed over a first matrix layer;
the first optical device structures have a first depth from the first matrix layer to a first upper surface of the first optical device structures;
a bottom surface of the first optical device structures contact an etch stop layer;
the second matrix stack structures define the second optical device structures;
the second matrix stack structures include the first matrix layer and the second matrix layer disposed over the first matrix layer;
the second optical device structures have a second depth from an optical device substrate to a second upper surface of the second optical device structures; and
a bottom surface of the second optical device structures contact a top surface of a substrate.

13. The method of claim 12, further comprising shrinking at least one of the first vias.

14. An optical device, comprising:
a first section of first optical device structures, wherein:
first matrix stack structures define the first optical device structures;
the first matrix stack structures include a second matrix layer disposed over a first matrix layer; and
the first optical device structures have a first depth from the first matrix layer to a first upper surface of the first optical device structures;
a bottom surface of the first optical device structures contact an etch stop layer; and
a second section of second optical device structures, wherein:
second matrix stack structures define the second optical device structures;
the second matrix stack structures include the first matrix layer and the second matrix layer disposed over the first matrix layer;
the second optical device structures have a second depth from an optical device substrate to a second upper surface of the second optical device structures; and
a bottom surface of the second optical device structures contact a top surface of a substrate.

15. The optical device of claim 14, wherein the first optical device structures and the second optical device structures have a device refractive index greater than or equal to 2.0.

16. The optical device of claim 15, wherein the first matrix stack structures and the second matrix stack structures have a matrix stack refractive index less than 2.0.

17. The optical device of claim 16, wherein a contrast ratio between the device refractive index and the matrix stack refractive index is about 1.7:1.45 to about 3.7:1.45.

18. The optical device of claim 14, wherein the second matrix layer is disposed on an etch-stop layer, and wherein the second matrix stack structures further include the etch-stop layer.

19. The optical device of claim 15, wherein the first optical device structures and the second optical device structures comprise one or more of silicon oxycarbide (SiOC), titanium dioxide ($TiO_2$), silicon dioxide ($SiO_2$), vanadium (IV) oxide (VOX), aluminum oxide ($Al_2O_3$), aluminum-doped zinc oxide (AZO), indium tin oxide (ITO), tin dioxide ($SnO_2$), zinc oxide (ZnO), tantalum pentoxide ($Ta_2O_5$), silicon nitride ($Si_3N_4$), zirconium dioxide ($ZrO_2$), niobium oxide ($Nb_2O_5$), cadmium stannate ($Cd_2SnO_4$), or silicon carbon-nitride (SiCN) containing materials.

20. The optical device of claim 14, wherein the first matrix layer is about 100 to about 750 nanometers (nm) thick and the second matrix layer is about 100 to about 750 nm thick.

* * * * *